April 19, 1955   F. C. HOLBROOK   2,706,408
PITOT TUBE
Filed May 17, 1950
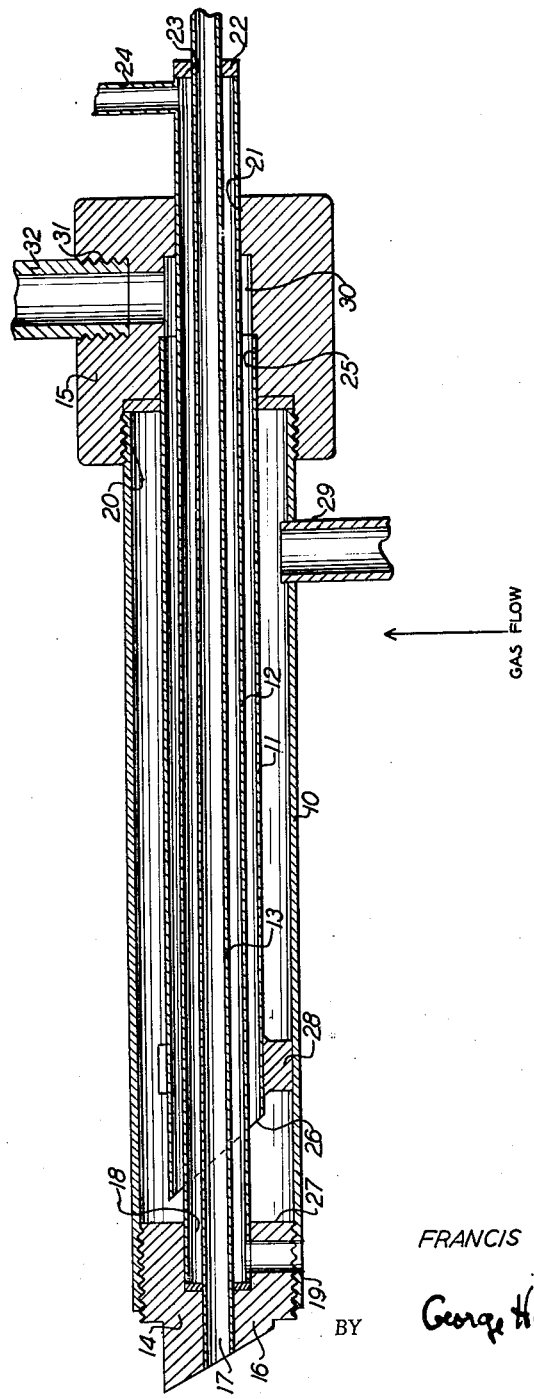
INVENTOR
FRANCIS C. HOLBROOK
BY George H. Mitchell, Jr.

United States Patent Office 2,706,408
Patented Apr. 19, 1955

2,706,408
PITOT TUBE

Francis C. Holbrook, Brooklyn, N. Y.

Application May 17, 1950, Serial No. 162,473

2 Claims. (Cl. 73—212)

This invention relates to measuring devices, and more particularly to instruments used for determining the velocity of fluids by differential pressures, such as a Pitot tube.

Where such instruments are used in the measurement of gases at relatively high, or low, temperatures, difficulties arise which are not present at ordinary temperatures. In the case of a gas flowing at high temperature it is usually necessary to conduct it in flues which are lined with refractory material, and the usual Pitot tube, with metal tubing for sampling the gas, could not be used to measure the velocity of flow without damage.

Where the temperature of the gas to be measured is relatively low, there may be a tendency for moisture to condense, and freeze, in the sampling tube which, if unchecked, results in blocking the tube entirely.

There have been various attempts in the past to maintain the temperature of a Pitot tube at a sufficiently high value as to prevent condensation of moisture, usually by means of an electrical heating means, but these arrangements are of no use where the temperature of the tube must be cooled to prevent destruction of the metal of which it is made.

Therefore it is an object of the present invention to provide a device for sampling gas, such as a Pitot tube, in which the temperature of the device may be maintained at a proper level, whether the device is to be used with gases at either high, or low, temperatures.

It is also an object of the invention to provide a Pitot tube with means for the circulation of heat-exchanging fluid so as to maintain the temperature of the tube at a satisfactory level.

It is a further object of the invention to provide a Pitot tube having a casing which projects into a stream of gas in which heat-exchanging fluid may be circulated in varying amounts in different portions of the casing so that greater amounts of the fluid will come in contact with portions of the casing subject to the greater temperature differential.

Another object of the invention is to provide a Pitot tube which may be easily assembled and disassembled, and constructed of a minimum number of elements of simple construction.

With these objects in view, and those which will be evident to one skilled in the art, the description of the invention follows, which may be read in conjunction with the accompanying drawing which is illustrative of a preferred construction, and in which the single figure is a cross-sectional elevation taken on the center line of the assembly.

In accordance with the invention there are provided a plurality of tubular elements 10, 11, 12, and 13, disposed one within another, and a pair of cap elements 14 and 15 which may be threaded on the ends of tube 10. The cap 14 is provided with an axially extending opening 17 to receive one end of the static tube 13. The outer face 16, of the cap, may be finished with its surface lying in a plane perpendicular to the axis of the static tube, but in the preferred form it is disposed at an angle. The cap 14 may also be recessed, as at 18, to receive one end of the dynamic tube 12, while the radially extending passage 19, which extends through the tubes 10 and 12 permits the admission of the gas to be sampled into the tube 12.

The cap 15 may be provided with a threaded recessed portion 20 for engagement with the end of tube 10, and an axially extending opening 21 through which the end of the tubes 12 and 13 may project. The spacer 22, provided with axially disposed opening 23, serves to close the end of tube 12, and support the end of tube 13 in spaced relation to it. The outlet 24 provides communication between the tube 12 and a measuring instrument. The cap 15 is also recessed, as at 25, to support one end of the tube 11, the other end of which is provided with thin, radially and longitudinally extending, fins 28 to support it in spaced relation to the tube 10. The open end 26 of the tube 11 may be cut off in a plane perpendicular to the axis of the tube, or may be variously shaped to suit the purpose, but a preferred construction involves the provision of variable spacing between the periphery 26 and the inner face 27 of the cap 14, this space being greatest near the side of the tube 10 against which the gas being measured first impinges, and which therefore requires the greatest amount of heat transfer.

Heat-exchanging fluid, such as water, may be introduced into the tube 10 through an inlet 29. The fluid will then travel to the left, as viewed in the figure, and passing over the edge 26 will then travel to the right along the tube 11 until it reaches the recess 30 in the cap 15, from which it may be drained off through the conduit 32, threaded into opening 31; or the fluid received from conduit 32 may pass through another heat-transfer stage and be returned to inlet 29 for re-use. It will be apparent that the lower portion of the tube 10, as viewed in the figure, will receive the effects of a greater amount of fluid flowing through the tube and past the less constricted portion of the edge 26, and that due to the relatively narrow space between the upper portion of the marginal edge 26 and the face 27 of cap 14, a relatively smaller amount of fluid will flow in the upper portions of tube 10. If the gas to be measured is at high temperature and if it flows upwardly as indicated by the arrow, and if cold water is introduced into the assembly, the irregular flow of water in the assembly will tend to maintain the entire area to be cooled at nearly uniform temperature because of the increased heat-transfer effect produced in the lower portion which receives the initial effects of the gas stream. Similarly, where the measured gas is at low temperature, a condition which occurs in normal air at high altitude, the heat-exchanging fluid may be warm water. If the device were to be used as an air-speed indicator for an airplane provided with a liquid-cooled power plant, this same liquid can be circulated through the assembly in order to prevent the formation of ice in the gas sampling tubes 12, and 13. Furthermore, if the airplane is provided with air-cooled propelling means, the hot gases of exhaust from the power plant may be introduced into the present device for the same purpose as any liquid. In fact, it will be apparent that while a liquid such as water may be the most desirable heat-exchanging fluid to use in most cases, other liquids and gases are equally well adapted to the purpose.

I claim:

1. A Pitot tube comprising, an elongated tubular casing closed at both ends and adapted to be supported at one end to project into the stream of a gas flowing at right angles to the length thereof, static and dynamic tubes substantially centrally disposed within the casing and extending substantially the length thereof, said casing having an axial opening and an impact opening at the unsupported end, said impact opening being connected with said dynamic tube and disposed upon the side of said casing first impinged by said flowing gas and said axial opening being connected with said static tube, said casing being provided adjacent said one end with inlet and outlet means for the circulation of heat-exchanging fluid within the casing, and a third tubular element within the casing sealed to said one end of said casing surrounding said static and dynamic tubes radially spaced therefrom and from the inner surface of the casing, the interior of one end of said third tubular element being connected for communication with one of said means for circulating heat-exchanging fluid at said one end of the casing, the other end of said third tubular element having its circumferential edge terminating spaced from the other end of said closed casing to provide a restricted longitudinal path for circulation of said heat-exchanging fluid, whereby fluid admitted at said one end of the casing passes to the other end and returns to said one end for discharge from the casing, said spacing between said other end of the casing and said termination of the third tubular element being circumferentially varied and having the maximum spacing disposed on the side of the casing first impinged by said flowing gas.

2. Apparatus as defined in claim 1, wherein the inner surface of said closed casing at said other end includes a portion disposed in a flat plane normal to the axis of the casing, and the termination of said third tubular element adjacent said other end lies in a flat plane disposed angularly with respect to said first-mentioned plane.

References Cited in the file of this patent

UNITED STATES PATENTS

| | | |
|---|---|---|
| 2,001,556 | Turner | May 14, 1935 |
| 2,179,500 | Diehl | Nov. 14, 1939 |
| 2,356,845 | Hines | Aug. 29, 1944 |
| 2,550,933 | McEvoy | May 1, 1951 |

FOREIGN PATENTS

| | | |
|---|---|---|
| 33,033 | Norway | Aug. 21, 1921 |